US010235872B2

(12) United States Patent
Oh

(10) Patent No.: US 10,235,872 B2
(45) Date of Patent: Mar. 19, 2019

(54) METHOD FOR SETTING MULTI REMOTE CONTROL IN VEHICLE AND MOBILE COMMUNICATION TERMINAL THEREOF

(71) Applicants: Hyundai Motor Company, Seoul (KR); Kia Motors Corporation, Seoul (KR)

(72) Inventor: Se Min Oh, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/819,033

(22) Filed: Nov. 21, 2017

(65) Prior Publication Data

US 2018/0268683 A1  Sep. 20, 2018

(30) Foreign Application Priority Data

Mar. 15, 2017  (KR) .................. 10-2017-0032267

(51) Int. Cl.
*H04W 4/80* (2018.01)
*G08C 17/02* (2006.01)
*B60K 35/00* (2006.01)
*H04W 4/04* (2009.01)

(52) U.S. Cl.
CPC ............. *G08C 17/02* (2013.01); *B60K 35/00* (2013.01); *H04W 4/046* (2013.01); *H04W 4/80* (2018.02)

(58) Field of Classification Search
CPC ........ G08C 17/02; H04W 4/80; H04W 4/046; B60K 35/00
See application file for complete search history.

(56) References Cited

U.S. PATENT DOCUMENTS

2012/0149341 A1* 6/2012 Tadayon .............. H04B 5/0062
455/412.1
2017/0050521 A1* 2/2017 Shaw ..................... B60K 35/00

* cited by examiner

*Primary Examiner* — Chuong A Ngo
(74) *Attorney, Agent, or Firm* — Mintz Levin Cohn Ferris Glovsky and Popeo, P.C.; Peter F. Corless

(57) ABSTRACT

A method for setting a multi remote control in a vehicle includes: a communicator configured to perform wireless communication with a plurality of mobile communication terminals in the vehicle, a storage configured to store information related to the plurality of mobile communication terminals and remote control function setting information of a device in the vehicle, and a controller configured to distinguish between a mobile communication terminal located in a front seat and a mobile communication terminal located in a rear seat based on short-range communication connection strength of each of a plurality of mobile communication terminals inside the vehicle, the controller distributing each of a front seat remote control function and a rear seat remote control function to the distinguished front seat or rear seat mobile communication terminal.

18 Claims, 12 Drawing Sheets

METHOD FOR SETTING MULTI REMOTE CONTROL IN VEHICLE AND MOBILE COMMUNICATION TERMINAL THEREOF

CROSS-REFERENCE TO RELATED APPLICATION

This application claims under 35 U.S.C. § 119(a) the benefit of Korean Patent Application No. 10-2017-0032267, filed on Mar. 15, 2017 in the Korean Intellectual Property Office, the entire contents of which are incorporated by reference herein.

BACKGROUND

1. Technical Field

Embodiments of the present disclosure relate to a method for setting a multi remote control in a vehicle and a mobile communication terminal thereof.

2. Description of the Related Art

A vehicle typically is equipped with various additional service devices for the comfort and safety of a driver and other vehicle occupants.

Specifically, the additional service devices may include a safety aid device, such as a lane departure warning system for preventing departure of the vehicle from a lane where the vehicle is running, by assisting the driver in manipulating the steering wheel, and an additional service guide, such as a navigation system for guiding the driver along a route to a destination chosen by the driver and providing information about surroundings of the route.

In addition, the additional service devices may include a service to play various media, such as music, movies, television programs, etc., through Bluetooth communication with a mobile communication terminal carried by the driver, or a hands-free calling service to assist the driver in making calls without taking out his/her cell phone.

In the meantime, there might other passengers in the vehicle apart from the driver, who carry their own mobile communication terminals, and considering such a situation, various ways are being sought to provide more convenient driving environments even for the other passengers.

Also, a method for distributing a remote control function to a mobile communication terminal inside a vehicle in a more convenient manner has been studied.

SUMMARY

Embodiments of the present disclosure provide a method for setting a multi remote control in a vehicle and a mobile communication terminal thereof for automatically distributing a remote control function through Bluetooth in a vehicle to a mobile communication terminal.

Additional aspects of the disclosure will be set forth in part in the description which follows and, in part, will be apparent from the description, or may be learned by practice of the disclosure.

In accordance with one aspect of the present disclosure, a vehicle includes: a communicator configured to perform wireless communication with a plurality of mobile communication terminals in the vehicle; a storage configured to store information related to the plurality of mobile communication terminals and remote control function setting information of device in the vehicle; and a controller configured to distinguish between a mobile communication terminal located in a front seat and a mobile communication terminal located in a rear seat based on short-range communication connection strength of each of the plurality of mobile communication terminals inside the vehicle, the controller distributing each of a front seat remote control function and a rear seat remote control function to the distinguished front seat or rear seat mobile communication terminal.

When whether the mobile communication terminal is located in the front seat or the rear seat is not determined based on the short-range communication connection strength, the controller distinguishes whether the mobile communication terminal is located in the front seat or the rear seat based on global positioning system (GPS) position information of each of the plurality of mobile communication terminals and a traveling direction of the vehicle.

The controller transmits a selection request for a remote control function to the plurality of mobile communication terminals when the mobile communication terminal located in the front seat or rear seat is not distinguished based on the short-range communication connection strength or the GPS position information, and the controller sets the returned remote control function to the remote control function of the corresponding mobile communication terminal.

When transmitting the selection request for the remote control function, the controller transmits a request for inquiring whether or not to use the multi-remote control function.

The controller distinguishes between the mobile communication terminal located in the front seat and the mobile communication terminal located in the rear seat based on the short-range communication connection strength of each of the plurality of mobile communication terminals positioned in the vehicle when the door open signal is generated, and redistributes the front seat remote control function and the rear seat remote control function to the distinguished front seat or rear seat mobile communication terminal.

The vehicle may further include: a display displaying various information related to the vehicle, wherein the controller transmits the remote control function setting complete information for each of the plurality of mobile communication terminals after completion of the setting of the remote control function and displays the remote control function set in each of the plurality of mobile communication terminals in a pop-up type through the display.

The short-range communication connection strength is the Bluetooth communication connection strength.

The front seat remote control function is a hands free calling function and the rear seat remote control function is a remote control function for devices in the vehicle.

In accordance with one aspect of the present disclosure, a vehicle includes: a communicator configured to perform wireless communication with a plurality of mobile communication terminals in the vehicle; a storage configured to store information related to the plurality of mobile communication terminals and remote control function setting information of device in the vehicle; and a controller configured to transmit a request for selecting a remote control function to each of the plurality of mobile communication terminals that are pre-registered and located in the vehicle and configured to set a returned remote control function to the remote control function of the corresponding mobile communication terminal.

When transmitting the selection request for the remote control function, the controller transmits a request for inquiring whether or not to use the multi-remote control function.

In accordance with one aspect of the present disclosure, a mobile communication terminal includes: a communicator configured to perform wireless communication with a vehicle; an inputter configured to receive control information according to a user's selection; a display configured to display information related to remote control function settings transmitted from the vehicle; a global positioning system (GPS) receiver configured to receive GPS signals; and a controller configured to display whether or not to use a multi remote control function and a request to select the remote control function, which is transmitted from the vehicle, through the display and configured to return the information selected by the user to the vehicle.

The controller returns the short-range communication connection strength to the vehicle at the request of the vehicle.

Upon request of the vehicle, the controller returns GPS position information determined on the basis of the GPS signal, to the vehicle.

In accordance with one aspect of the present disclosure, a method for setting up multi remote control in a vehicle, the method includes: when the vehicle is booted, requesting and receiving the short-range communication connection strength to a plurality of mobile communication terminals located in the vehicle; distinguishing between the mobile communication terminal located in a front seat or the mobile communication terminal located in a rear seat based on the short-range communication connection strength; and distributing a front seat remote control function and a rear seat remote control function to the distinguished front seat or rear seat mobile communication terminal.

The request and reception of the short-range communication connection strength further includes requesting and receiving Global Positioning System (GPS) position information to the plurality of mobile communication terminals, wherein the distinguishing between the mobile communication terminal located in the front seat and the mobile communication terminal located in the rear seat based on the short-range communication connection strength further comprises when whether the mobile communication terminal is located in the front seat or the rear seat is not determined based on the short-range communication connection strength, distinguishing the mobile communication terminal located in the front seat and the mobile communication terminal located in the rear seat based on the GPS position information and the traveling direction of the vehicle.

When whether the mobile communication terminal is located in the front seat or the rear seat is not determined based on the short-range communication connection strength or the GPS position information, the vehicle transmits a request for selection of a remote control function to a plurality of mobile communication terminals, the vehicle sets a remote control function returned from the plurality of mobile communication terminals as a remote control function of the corresponding mobile communication terminal, and the vehicle displays a remote control function set for each of the plurality of mobile communication terminals in a pop-up type through a display.

The method may further include: after distributing the front seat remote control function and the rear seat remote control function, when a door open signal is generated, requesting and receiving a short-range communication connection strength to and from the plurality of mobile communication terminals; distinguishing between the mobile communication terminal located in the front seat and the mobile communication terminal located in the rear seat based on the short-range communication connection strength; and redistributing the front seat remote control function and the rear seat remote control function to the distinguished front seat or rear seat mobile communication terminal.

The method may further include: after distributing the front seat remote control function and the rear seat remote control function, transmitting the corresponding remote control function setting completion information to each of the plurality of mobile communication terminals; and displaying the remote control function set in each of the plurality of mobile communication terminals in a pop-up type through a display of the vehicle.

The short-range communication connection strength is the Bluetooth communication connection strength.

The front seat remote control function preferably is a hands free calling function and the rear seat remote control function preferably is a remote control function for devices in the vehicle.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The principle and embodiments of the present disclosure will now be described with reference to accompanying drawings.

Figure 1:
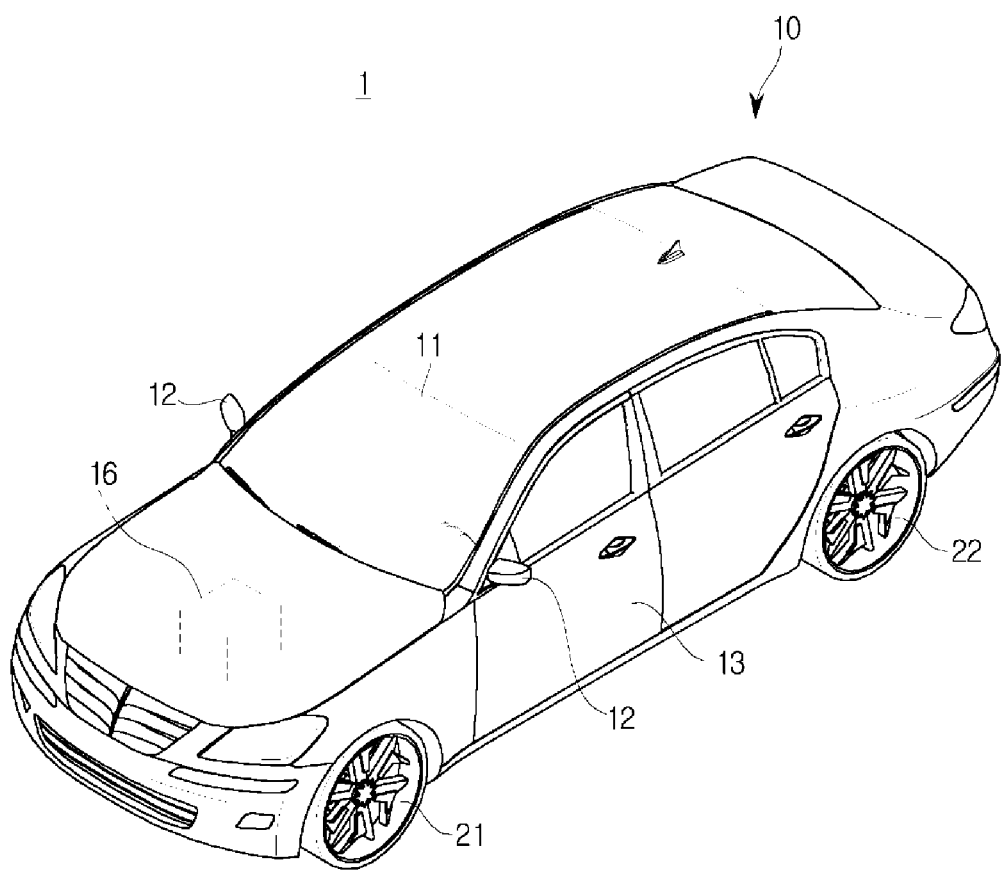
FIG. 1 is a schematic view of an exterior of a vehicle.

FIG. 1 is a schematic view of an exterior of a vehicle.

Referring to FIG. 1, an exterior of a vehicle 1 may include a main body 10 that constitutes the exterior of the vehicle 1, a wind screen 11 for providing front visibility ahead of the vehicle 1 for the driver, side mirrors 12 for helping the driver see behind the vehicle 1, doors 13 for shielding the interior of the vehicle 1 from the outside, and wheels 21 and 22 for moving the vehicle 1 including front wheels 21 located in a front part of the vehicle 1, rear wheels 22 located in a rear part of the vehicle 1.

The wind screen 11 is mounted on the upper front of the main body 10 for allowing the driver to obtain views ahead of the vehicle 1. The side mirrors 12 include a left side mirror and a right side mirror placed on the left and right sides of the main body 10, respectively, for helping the driver obtain views behind and to the sides of the vehicle 1.

The doors 13 may be pivotally attached onto the left and right sides of the main body 10, and opened for the driver and passenger to enter or exit the vehicle 1 and closed for shielding the inside of the vehicle 1 from outside.

Further, the vehicle 1 may include a power system 16 for controlling and turning the wheels 21 and 22, a steering system (not shown) for changing a moving direction of the vehicle 1, and a braking system (not shown) for stopping the movement of the wheels.

The power system 16 provides turning force to the front or rear wheels 21 or 22 to move the main body 10 forward or backward. The power system 16 may include a motor that produces the turning force from electrical power supplied from a charging battery (not shown) or a combustion engine (not shown) that burns fuel to create the turning force.

The steering system may include a steering handle 42 (see FIG. 2) manipulated by the driver for controlling a driving direction, a steering gear (not shown) for transforming rotary motion of the steering handle 42 to reciprocating motion, and a steering link (not shown) for transferring the reciprocating motion of the steering gear to the front wheels 21. The steering system may change the moving direction of the vehicle 1 by changing the direction of the wheel rotation axis.

The braking system may include a brake pedal (not shown) manipulated by the driver for braking operation, a brake drum (not shown) combined with the wheels 21, and 22, and a brake shoe (not shown) for braking the rotation of the brake drum. The braking system may brake driving of the vehicle 1 by stopping the rotation of the wheels 21 and 22.

Figure 2:
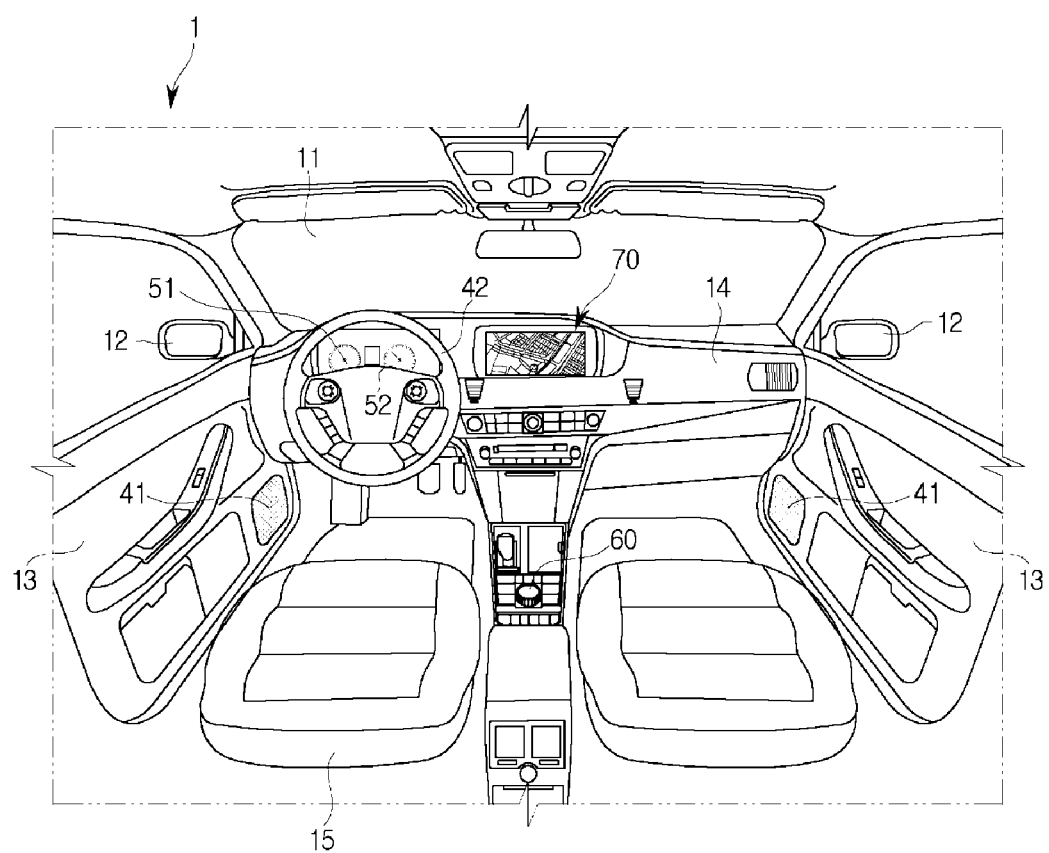
FIG. 2 is a schematic view of an interior of the vehicle.

FIG. 2 is a schematic view of an interior of the vehicle.

The interior of the vehicle 1 may include a dashboard 14 on which various systems are installed for the driver to manipulate the vehicle 1, a driver seat 15 to be occupied by the driver, cluster indicators 51, and 52 for indicating information about operation of the vehicle 1, and a navigation system 70 for providing not only a route guidance function to give directions but also audio and video functions in response to an instruction from the driver.

The dashboard 14 may be formed to protrude toward the driver from the bottom of the wind screen 11, and to allow the driver to manipulate the various systems installed on the dashboard 14 while looking forward.

The driver seat 15 is located opposite the dashboard 14, and allows the driver to drive the vehicle 1 while keeping his/her eyes on the road ahead of the vehicle 1 and various systems on the dashboard in a comfortable position.

The cluster indicators 51 and 52 may be installed on the dashboard 14 to face the driver seat 15, and may include a speed gauge 51 for indicating the current speed of the vehicle 1 and an rpm gauge 52 for indicating revolutions per minute of the power system.

The navigation system 70 may include a display for displaying information about a road on which the vehicle 1 is traveling or a route to a destination intended by the driver, and a speaker 41 for producing sound in response to the control command of the driver. For example, it is possible to install an audio video and navigation (AVN) system in which audio and video players and a navigation system are incorporated on the vehicle.

The navigation system 70 may be installed on the center fascia. The center fascia refers to a control panel portion located on the dashboard 14 between the driver and passenger seats, where the dashboard 14 and a shift lever are connected in the vertical direction, and the navigation system 70, an air conditioner, a heater controller, a duct, a cigar jack and ash tray, a cup holder, etc., are installed therein. The center fascia may also serve to separate the driver seat from the passenger seat along with a center console.

Further, there may be an extra jog dial 60 for manipulating operation of various systems, including the navigation system 70.

In an embodiment of the present disclosure, the jog dial 60 may not only manipulate the operation by being turned or pressed, but may also have a touch recognizable touch pad to recognize handwriting of the user's finger or extra touch-recognizable tool for operation manipulation.

Figure 3:
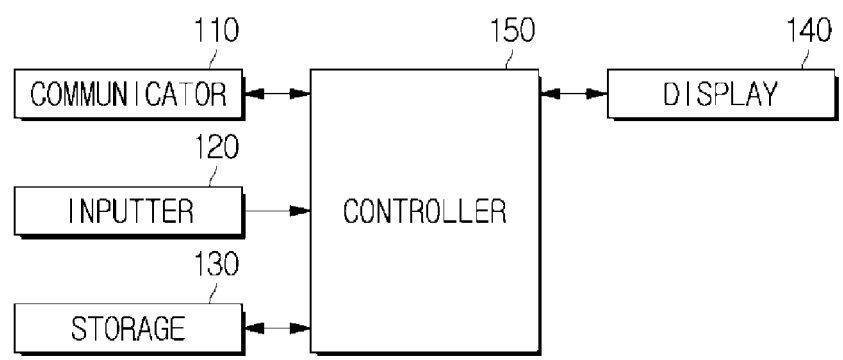
FIG. 3 is a control block diagram illustrating details of a configuration of a vehicle.

FIG. 3 is a control block diagram illustrating details of a configuration of a vehicle.

Hereinafter, description will be made with reference to FIGS. 4 to 7 illustrating exemplary diagrams a method for setting a multi-remote control.

Referring to FIG. 3, the vehicle 100 may include a communicator 110, an inputter 120, a storage 130, a display 140, and a controller 150.

In particular, the communicator 110 may be configured to perform wireless communication with a mobile communication terminal (see, e.g., reference number 200 in FIG. 8) in the vehicle.

The communicator 110 may include one or more components that enable communication with an external device, for example, at least one of a short-range communication module, wired communication module, and wireless communication module.

The short-range communication module may include various short range communication modules for transmitting and receiving signals within a short range over a wireless communication network, such as a Bluetooth module, an infrared communication module, a radio frequency identification (RFID) communication module, a wireless local access network (WLAN) communication module, a near field communication (NFC) module, a Zigbee communication module, etc.

The wired communication module may include not only one of various wired communication modules, such as a controller area network (CAN) communication module, but also one of various cable communication modules, such as a universal serial bus (USB), a high definition multimedia interface (HDMI), a digital visual interface (DVI), recommended standard (RS) 232, a power cable, or a plain old telephone service (POTS).

The wireless communication module may include a wireless communication module for supporting various wireless communication schemes, such as a radio data system-traffic message channel (RDS-TMC), a digital multimedia broadcasting (DMB) module, a wireless fidelity (WiFi) module, and a wireless broadband (Wibro) module, and plus, a global system for mobile communication (GSM) module, a code division multiple access (CDMA) module, a wideband code division multiple access (WCDMA) module, a universal mobile telecommunications system (UMTS) , a time division multiple access (TDMA) module, a long term evolution (LTE) module, etc.

The wireless communication module may also include a wireless communication interface with an antenna and receiver for receiving traffic information signals. Further, the wireless communication module may include a traffic information signal conversion module for demodulating a received analog radio signal, which is received through the wireless communication interface, into a digital control signal.

The inputter 120 may include some hardware devices for the user input, e.g., different buttons or switches, a pedal, a keyboard, a mouse, a track ball, various levers, a handle, or a stick.

The inputter 120 may also include a software device, i.e., a Graphical User Interface (GUI) such as a touch pad for user input. The touch pad may be implemented with a touch screen panel (TSP), thus forming an interlayer structure with the display 140.

The storage 130 may be configured to store information related to a mobile communication terminal that may be communicated and remote control function setting information.

The storage 130 may be implemented with at least one of a non-volatile memory device, such as cache, read only memory (ROM), programmable ROM (PROM), erasable programmable ROM (EPROM), electrically erasable programmable ROM (EEPROM), a volatile memory device, such as random access memory (RAM), or a storage medium, such as hard disk drive (HDD) or compact disk (CD) ROM, but is not limited thereto. The storage 130 may be a memory implemented with a chip separate from the aforementioned processor in relation to the controller 150, or may be implemented integrally with the processor in a single chip.

The display 140 may display various information related to the vehicle 100, including information related to setting up the multi remote control function.

Figure 7:
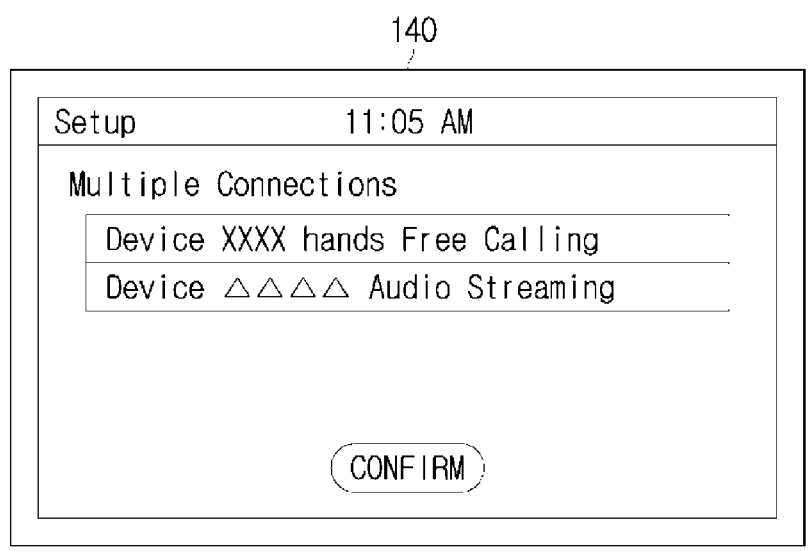

Referring to FIG. 7, the display 140 may display a remote control function distributed to a mobile communication terminal 200, preferably one or more of a plurality of mobile communication terminals 200.

The display 140 may include a Cathode Ray Tube (CRT), a Digital Light Processing (DLP) panel, a Plasma Display Panel (PDP), a Liquid Crystal Display (LCD) panel, an Electro Luminescence (EL) panel, an Electrophoretic Display (EPD) panel, an Electrochromic Display (ECD) panel, a Light Emitting Diode (LED) panel, an Organic Light Emitting Diode (OLED) panel, etc., but is not limited thereto.

Figure 8:
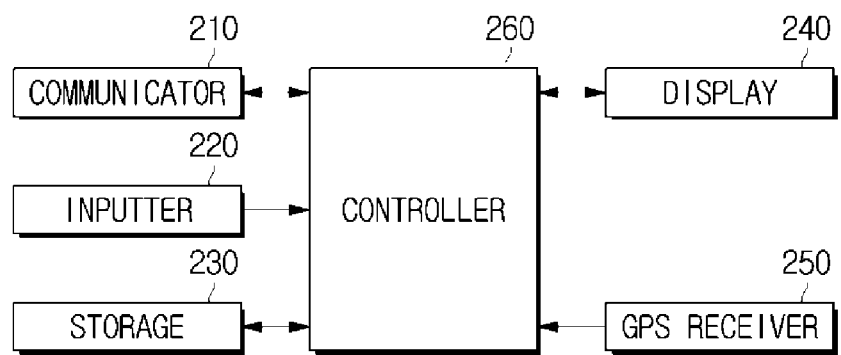
FIG. 8 is a control block diagram illustrating details of a configuration of a mobile communication terminal.

The controller 150 distinguishes between the mobile communication terminal 200 located in front seat and the mobile communication terminal 200 located in the rear seat based on short-range communication connection strength of each of a plurality of mobile communication terminals 200 of FIG. 8 inside the vehicle, the controller 150 distributing each of a front seat remote control function and a rear seat remote control function to the distinguished front seat or rear seat mobile communication terminal 200. The short-range communication connection strength is the Bluetooth communication connection strength.

The controller 150 may request and receive the short-range communication strength and global positioning system (GPS) position information to and from the plurality of mobile communication terminals 200 in the vehicle when the vehicle is booted. The term "booting" means that the vehicle 100 performs a system boot in order to set up the multi-remote control function. For example, when the multi-remote control function is performed in the navigation system 70, it means that the navigation system is booted. When the multi-remote control function is performed in ahead unit (not shown), it means that the head unit is booted, but is not limited thereto. That is, "booting" refers to the vehicle 100 being switched to a mode for setting a multi-remote control function.

Figure 4:
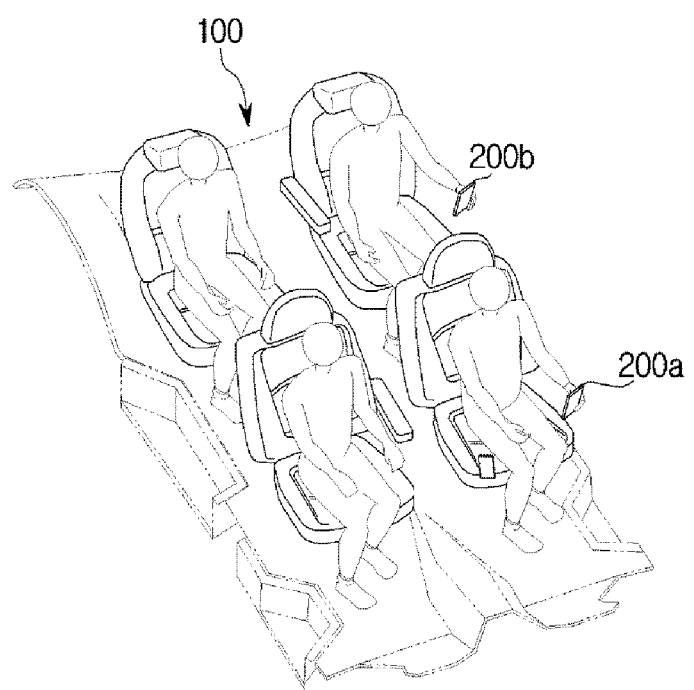
FIGS. 4 to 7 are exemplary diagrams illustrating a method for setting a multi-remote control.

Referring to FIG. 4, the controller 150 may distinguish between a mobile communication terminal 200a located on the front seat and a mobile communication terminal 200b located on the rear seat based on the short-range communication connection strength.

When the mobile communication terminal 200 is divided into the front seat and the rear seat based on the short-range communication connection strength, a criterion distinguishing between the front seat and the rear seat may be set according to the position of the Bluetooth module (not shown) in the vehicle 100.

For example, when the Bluetooth module is installed in the front half of the vehicle 100 such as the center fascia, the mobile communication terminal 200a having strong Bluetooth communication connection strength among the plurality of mobile communication terminals 200 is determined as a mobile communication terminal located in the front seat, and the mobile communication terminal 200b having a relatively lower Bluetooth communication connection strength than the mobile communication terminal 200 is determined as a mobile communication terminal located in the rear seat. When the Bluetooth module is installed in the second half of the vehicle 100, the mobile communication terminal 200b having relatively strong Bluetooth communication strength is determined to be a mobile communication terminal located on the rear seat according to the above-described principle.

The front seat remote control function is a hands free calling function, and the rear seat remote control function is a remote control function for devices in the vehicle, but is not limited thereto and may be changed or added according to an operator's need.

The in-vehicle device remote control function is defined as a remote control function capable of operating not only audio streaming remote control but also radio, media (CD/USB, AUX, sound/video player, My Music, and Bluetooth), and sound that may be provided in the in-vehicle device (for example, head unit including navigation). It is also possible to control all the operations of the units connected to the head unit via the CAN.

When whether the mobile communication terminal is located in the front seat or the rear seat is not determined based on the short-range communication connection strength, the controller 150 may distinguish whether the mobile communication terminal 200 is located in the front seat or the rear seat based on global positioning system (GPS) position information of each of the plurality of mobile communication terminal 200 and a traveling direction of the vehicle 100. The traveling direction of the vehicle 100 may be obtained based on information sensed through various sensors (not shown) provided on the vehicle 100.

In another embodiment, the controller 150 transmits a selection request for a remote control function to the plurality of mobile communication terminals 200 when the mobile communication terminal located in the front seat or rear seat is not distinguished based on the short-range communication connection strength or the GPS position information, and the controller 150 may set the remote control function returned to the remote control function of the corresponding mobile communication terminal 200.

When transmitting the selection request for the remote control function, the controller 150 transmits a request for inquiring whether or not to use the multi-remote control function.

Figure 5:
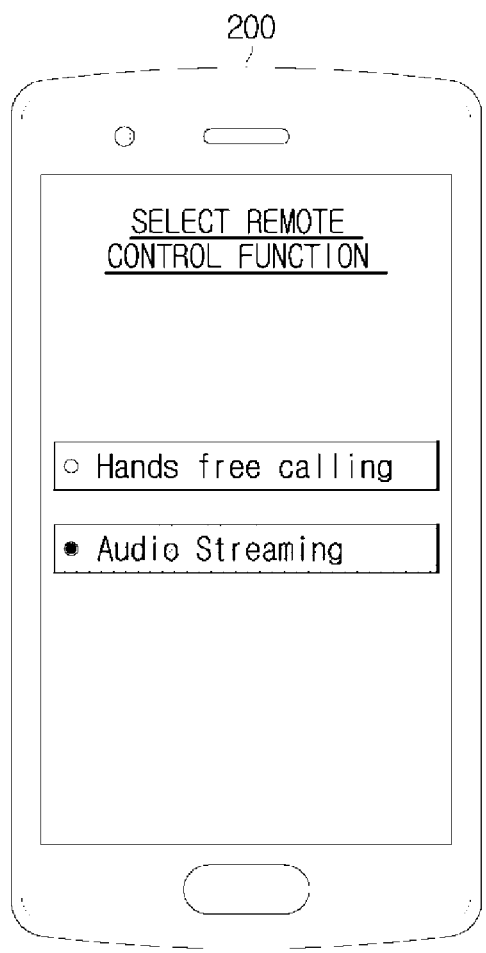

Referring to FIG. 5, the controller 150 transmits a remote control function selection request to the mobile communication terminal 200 through the communicator 110 so that the mobile communication terminal 200 displays a remote control function item such as hands free calling and audio streaming and may return a remote control function (for example, an audio streaming control function) selected by the user to the vehicle 100.

When the multi-remote control function unused answer is returned from the mobile communication terminal 200, the controller 150 may terminate the remote control function distribution procedure for the corresponding mobile communication terminal 200.

In another embodiment, the controller 150 distinguishes between the mobile communication terminal 200 located in the front seat and the mobile communication terminal 200 located in the rear seat based on the short-range communication connection strength of each of the plurality of mobile communication terminals 200 positioned in the vehicle when the door open signal is generated, and redistributes the front seat remote control function and the rear seat remote control function to the distinguished front seat or rear seat mobile communication terminal 200. When whether the mobile communication terminal 200 is located in the front seat or the rear seat is not determined based on the short-range communication connection strength, the controller 150 may distinguish whether the mobile communication terminal 200 is located in the front seat or the rear seat based on global positioning system (GPS) position information of the mobile communication terminal and a traveling direction of the vehicle.

For example, in the case where the door is opened to change the driver when the vehicle 100 travels and then stops, the mobile communication terminal (200a in FIG. 4) located on the front seat and the mobile communication terminal (200b in FIG. 4) located on the rear seat may be mutually changed. For this purpose, when the door open signal is generated, the controller 150 re-executes the distinction of front seat or rear seat mobile communication terminal 200 and the distribution of the front seat remote control function and the rear seat remote control function using the short-range connection strength.

The controller 150 transmits the remote control function setting complete information for each of the plurality of mobile communication terminals 200 after completion of the setting of the remote control function and displays the remote control function set in each of the plurality of mobile communication terminals 200 in a pop-up type through the display 140.

Figure 6:
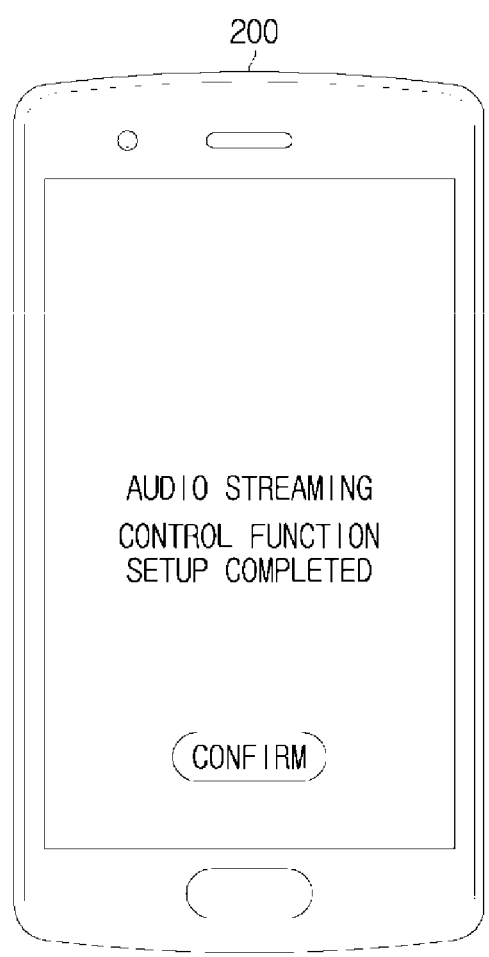

Referring to FIG. 6, as the controller 150 transmits the remote control function setting completion information to the mobile communication terminal 200, the mobile communication terminal 200 displays a statement such as "the completion of the audio streaming control function setting" on the screen, and it may be recognized that the user can perform the audio remote control using the mobile communication terminal 200.

Referring to FIG. 7, the display 140 of the vehicle 100 displays a remote control function set in each of the mobile communication terminals 200 in a pop-up type, such as "Device XXXX: Hands Free Calling, Device ΔΔΔΔ: Audio Streaming", so that a user in the vehicle may check it.

In another embodiment, a controller 150 may transmit a request for selecting a remote control function to each of a plurality of pre-registered mobile communication terminals 200 located in the vehicle and may set a remote control function, which is returned, to the remote control function of the corresponding mobile communication terminal 200.

When transmitting the selection request for the remote control function, the controller 150 transmits a request for inquiring whether or not to use the multi-remote control function.

Specifically, the controller 150 provides a plurality of remote control functions to the plurality of registered mobile communication terminals 200 when the plurality of mobile communication terminals 200 located in the vehicle is registered at the time of booting, so that it is possible to directly select.

That is, the user may directly select a desired remote control function using the mobile communication terminal 200.

The controller 150 may pre-determine whether to distribute the remote control function to the mobile communication terminal 200 automatically or to allow the user to directly select the remote control function using the short-range communication connection strength.

The controller 150 may be implemented with a memory (not shown) storing an algorithm to control operation of the components of the vehicle 100 or data about a program that implements the algorithm, and a processor (not shown) carrying out the aforementioned operation using the data stored in the memory. The memory and the processor may be implemented in separate chips. Alternatively, the memory and the processor may be implemented in a single chip.

FIG. 8 is a control block diagram illustrating details of the configuration of a mobile communication terminal.

Referring to FIG. 8, the mobile communication terminal 200 may include a communicator 210, an inputter 220, a storage 230, a display 240, a global positioning system (GPS) receiver 250, and a controller 260.

The communicator 210 may be configured to perform wireless communication with a vehicle 100.

The inputter 220 may be configured to receive control information according to a user's selection.

For example, as shown in FIG. 5, the inputter 220 may receive selection information of any one of the remote control functions requested from the vehicle 100. The storage 230 may be configured to store various information related to the mobile communication terminal 200.

The display 240 may be configured to display information related to the remote control function setting transmitted from the vehicle 100, but not limited thereto, and may display information related to the mobile communication terminal 200.

For example, the display 240 may display a list (see FIG. 5) of remote control functions transmitted from the vehicle 100 or display a remote control function distribution result message (see FIG. 6).

The global positioning system (GPS) receiver 250 may be configured to receive GPS signals.

The GPS receiver 250 is a receiver that observes and determines the position of a satellite with a satellite navigation positioning system. At this time, the GPS receiver 250 may receive the time and distance from three or more satellites and calculate the current position by the triangle method at three different distances.

The controller 260 may display whether or not to use a multi remote control function and a remote control function selection request, which is transmitted from the vehicle 100, through the display 240 and return the information selected by the user to the vehicle 100.

The controller 260 returns the short-range communication connection strength to the vehicle 100 at the request of the vehicle 100. The short-range communication connection strength is the Bluetooth communication connection strength.

Upon request of the vehicle 100, the controller 260 returns GPS position information determined on the basis of the GPS signal to the vehicle 100.

Figure 9:
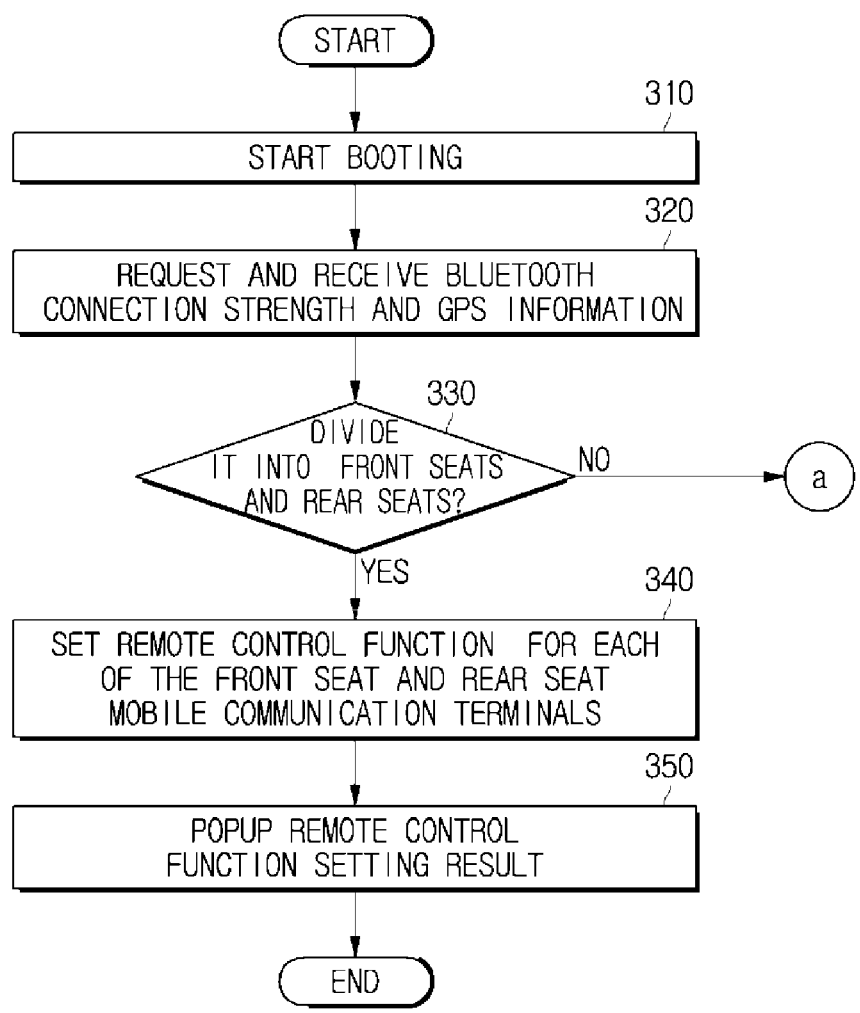
FIG. 9 is a flowchart illustrating a method for setting up a multi remote control, according to an embodiment of the present disclosure.

FIG. 9 is a flowchart illustrating a method for setting up multi remote control, according to an embodiment of the present disclosure.

First, when the vehicle is booted, the vehicle 100 may request and receive a short-range communication connection strength or Global Positioning System (GPS) position information to and from a plurality of mobile communication terminals 200 located in the vehicle (310, and 320). The short-range communication connection strength may be the Bluetooth communication connection strength.

Next, the vehicle 100 may distinguish between the mobile communication terminal located in the front seat and the mobile communication terminal located in the rear seat based on the short-range communication connection strength received from the mobile communication terminal 200 (330).

At this time, when the mobile communication terminal 200 is divided into the front seat and the rear seat based on the short-range communication connection strength, a criterion distinguishing between the front seat and the rear seat may be set according to the position of the Bluetooth module (not shown) in the vehicle 100.

For example, when the Bluetooth module is installed in the front half of the vehicle 100 such as the center fascia, the mobile communication terminal 200a (see FIG. 4) having strong Bluetooth communication connection strength among the plurality of mobile communication terminals 200 is determined as a mobile communication terminal located in the front seat, and the mobile communication terminal 200b (see FIG. 4) having a relatively lower Bluetooth communication connection strength than the mobile communication terminal 200a is determined as a mobile communication terminal located in the rear seat. When the Bluetooth module is installed in the second half of the vehicle 100, the mobile communication terminal 200b having relatively strong Bluetooth communication strength is determined to be a mobile communication terminal located on the rear seat according to the above-described principle.

When whether the mobile communication terminal 200 is located in the front seat or the rear seat is not distinguished based on the short-range communication connection strength, the vehicle 100 may distinguish whether the mobile communication terminal 200 is located in the front seat or the rear seat based on global positioning system (GPS) position information of the mobile communication terminal and a traveling direction of the vehicle.

Next, the vehicle 100 may distribute the front seat remote control function and the rear seat remote control function to the distinguished front seat or rear sear mobile communication terminal 200 (340).

The front seat remote control function may be a hands free calling function and the rear seat remote control function may be a remote control function for devices in the vehicle, but is not limited thereto.

Next, the vehicle 100 transmits the corresponding remote control function setting completion information to each of the plurality of mobile communication terminals 200, and displays the remote control function set in each of the plurality of mobile communication terminals in a pop-up type through a display (see FIG. 7) of the vehicle 100 (350). At this time, the mobile communication terminal 200 may display the remote control function assigned to itself (see FIG. 6).

Figure 10:
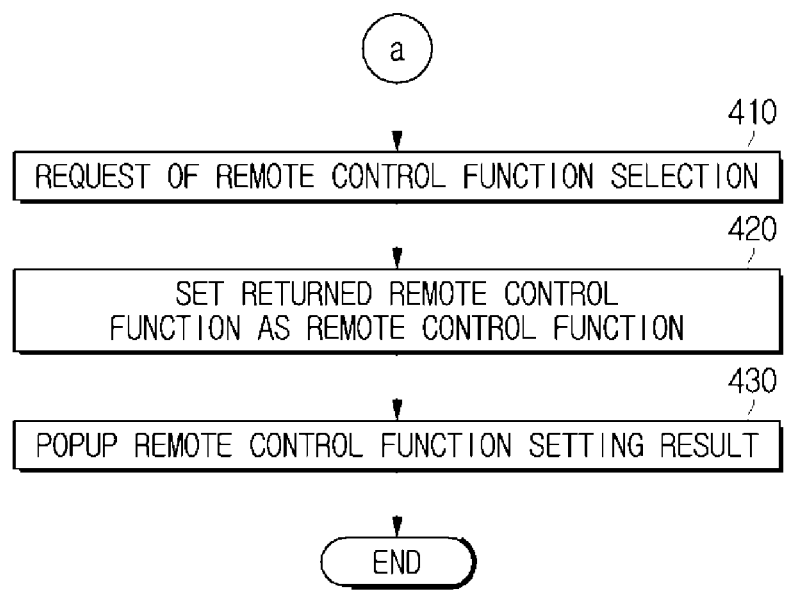
FIG. 10 is a flowchart illustrating a method for setting up a multi remote control, according to another embodiment of the present disclosure.

FIG. 10 is a flowchart illustrating a method for setting up multi remote control, according to another embodiment of the present disclosure, and the ⓐ process of FIG. 9 will be described.

When whether the mobile communication terminal 200 is located in the front seat or the rear seat is not determined based on the short-range communication connection strength or the GPS position information, the vehicle 100 transmits a request for selection of a remote control function to a plurality of mobile communication terminals 200 (410).

Next, the vehicle 100 sets a remote control function returned from the plurality of mobile communication terminals 200 as a remote control function of the corresponding mobile communication terminal 200 (420).

Next, the vehicle 100 displays a remote control function set for each of the plurality of mobile communication terminals in a pop-up type through a display (430). At this time, the mobile communication terminal 200 may display the remote control function assigned to itself.

Figure 11:
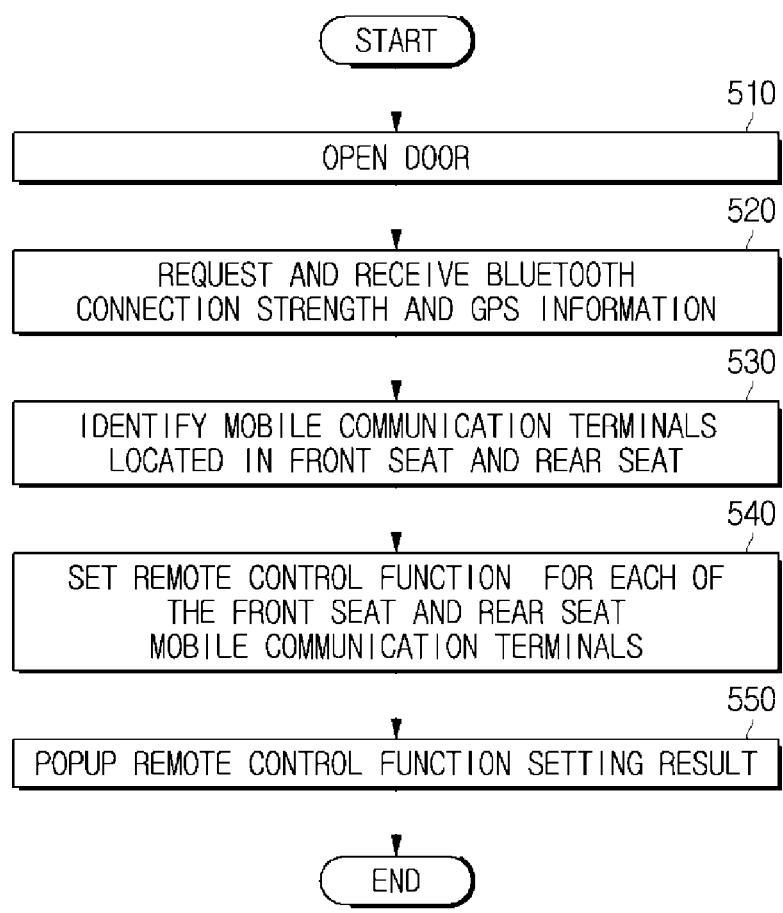
FIG. 11 is a flowchart illustrating a method for setting up a multi remote control, according to another embodiment of the present disclosure.

FIG. 11 is a flowchart illustrating a method for setting up multi remote control, according to another embodiment of the present disclosure.

Hereinafter, the following steps of a step (see the step 340) of distributing the front seat remote control function and the rear seat remote control function shown in FIG. 9 will be described as an example.

First, the vehicle 100 may detect the door open signal generation as the door is opened (510).

The vehicle 100 may request and receive a short-range communication connection strength (e.g., Bluetooth connection strength) or global positioning system (GPS) location information to and from the plurality of mobile communication terminals 200 (520).

Next, the vehicle 100 may distinguish between the mobile communication terminal 200 located in the front seat and the mobile communication terminal located in the rear seat based on the short-range communication connection strength (530). When the vehicle 100 does not distinguish the mobile communication terminal 200 located at the front seat or the rear seat of the vehicle 100 based on the short-range communication connection strength, it may be distinguished using the GPS location information.

Next, the vehicle 100 may re-distribute the front seat remote control function and the rear seat remote control function to the distinguished front seat or rear seat mobile communication terminals 200, respectively (540).

Next, the vehicle 100 may display a remote control function set for each of the plurality of mobile communication terminals in a pop-up type through the display (550).

Figure 12:
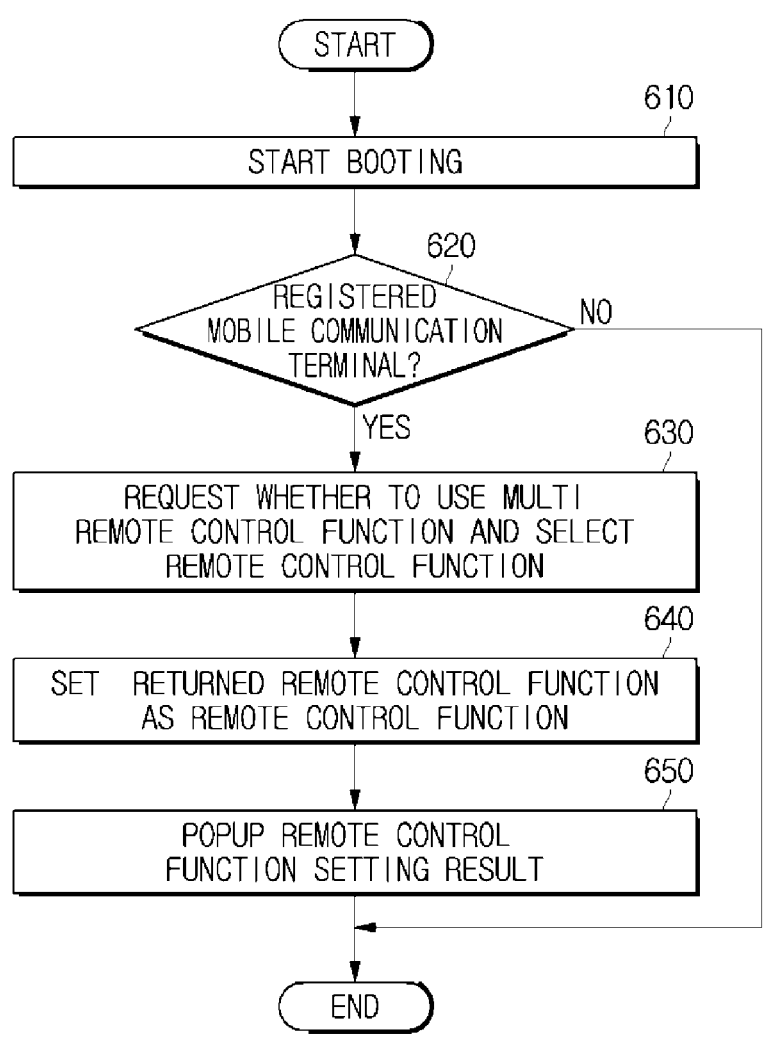
FIG. 12 is a flowchart illustrating a method for setting up a multi remote control, according to another embodiment of the present disclosure.

FIG. 12 is a flowchart illustrating a method for setting up multi remote control, according to another embodiment of the present disclosure.

First, when the vehicle is booted, the vehicle 100 may check whether a plurality of mobile communication terminals 200 located in the vehicle is registered mobile communication terminals (610, and 620).

When the mobile communication terminal is a registered mobile communication terminal, the vehicle 100 may transmit a request for each of the plurality of pre-registered mobile communication terminals to inquire whether to use the remote control function and the multi-remote control function (630).

Next, the vehicle 100 may set the returned remote control function as the remote control function of the mobile communication terminal (640). Although not shown, when the multi-remote control function unused answer is received from the mobile communication terminal 200, the vehicle 100 may end the step without distributing the remote control function to the corresponding mobile communication terminal 200.

Next, the vehicle 100 transmits the corresponding remote control function setting completion information to each of the plurality of mobile communication terminals 200, and displays the remote control function set for each of the plurality of mobile communication terminals in a pop-up type through the display (650). At this time, the mobile communication terminal 200 may display the remote control function assigned to itself.

When it is determined that the mobile communication terminal is not registered, according to the result of the step 620, the vehicle 100 may terminate all the procedures. Although not shown, when it is determined that the mobile communication terminal is not registered, according to the result of the step 620, the vehicle 100 may start the registration procedure of the mobile communication terminal 200.

As is apparent from the above description, according to the proposed method for setting of multi remote control in vehicle and vehicle and mobile communication terminal thereof, since the remote control function through the in-vehicle Bluetooth is automatically distributed to the mobile communication terminal, it is expected that the remote control function using the mobile communication terminal may be easily implemented.

Meanwhile, the embodiments of the present disclosure may be implemented in the form of recording media for storing instructions to be carried out by a computer. The instructions may be stored in the form of program codes, and when executed by a processor, may generate program modules to perform operation in the embodiments of the present disclosure. The recording media may correspond to computer-readable recording media.

The computer-readable recording medium includes any type of recording medium having data stored thereon that may be thereafter read by a computer. For example, it may be a ROM, a RAM, a magnetic tape, a magnetic disk, a flash memory, an optical data storage device, etc.

The embodiments of the present disclosure have thus far been described with reference to accompanying drawings. It will be obvious to people of ordinary skill in the art that the present disclosure may be practiced in other forms than the embodiments as described above without changing the technical idea or essential features of the present disclosure. The above embodiments are only by way of example, and should not be interpreted in a limited sense.

What is claimed is:

1. A vehicle, comprising:
a communicator configured to perform wireless communication with a plurality of mobile communication terminals in the vehicle, each of the plurality of the mobile communication terminals remotely controlling at least one of a plurality of functions of the vehicle;
a controller configured to identify a mobile communication terminal located in a front seat and a mobile communication terminal located in a rear seat based on short-range communication connection strength of each of the plurality of mobile communication terminals, to set at least one first function of the vehicle controlled by the mobile communication terminal located in the front seat, and to set at least one second function of the vehicle, different from the at least one first function, controlled by the mobile communication terminal located in the rear seat; and
a storage configured to store information related to the plurality of mobile communication terminals, and to store remote control function setting information of the at least one first function controlled by the mobile communication terminal located in the front seat and the at least one second function controlled by the mobile communication terminal located in the rear seat.

2. The vehicle according to claim 1, wherein when whether the mobile communication terminal is located in the front seat or the rear seat is not determined based on the short-range communication connection strength, the controller distinguishes whether the mobile communication terminal is located in the front seat or the rear seat based on global positioning system (GPS) position information of each of the plurality of mobile communication terminals and a traveling direction of the vehicle.

3. The vehicle according to claim 2, wherein the controller transmits a selection request for a remote control function to the plurality of mobile communication terminals when the mobile communication terminal located in the front seat or rear seat is not distinguished based on the short-range communication connection strength or the GPS position information, and the controller sets the returned remote control function to the remote control function of the corresponding mobile communication terminal.

4. The vehicle according to claim 3, wherein when transmitting the selection request for the remote control function, the controller transmits a request for inquiring whether or not to use a multi-remote control function.

5. The vehicle according to claim 1, wherein the controller identifies the mobile communication terminal located in the front seat and the mobile communication terminal located in the rear seat when a door open signal is generated.

6. The vehicle according to claim 1 further comprising:
a display displaying various information related to the vehicle,
wherein the controller controls operation of the display so as to display the remote control function setting information set in each of the plurality of mobile communication terminals in a pop up type through the display.

7. The vehicle according to claim 1, wherein the short-range communication connection strength is a Bluetooth communication connection strength.

8. The vehicle according to claim 1, wherein the at least one first function includes a hands free calling function, and the at least one second function includes at least one function performed by at least one device provided in the vehicle.

9. A mobile communication terminal, comprising:
a communicator configured to perform wireless communication with a vehicle;
an inputter configured to receive a user's input;
a controller configured to control communication with the vehicle, to control operation of the communicator so as to send a control signal for remotely controlling at least one of a plurality of functions of the vehicle based on the user's input; and
a display, wherein
when information of a multi-remote control function is received by the communicator, the controller controls operation of the display so as to display the received information of the multi-remote control function, and
when a request to select a remote control function is received by the communicator, the controller controls operation of the display so as to display the request to select the remote control function, and controls the communicator so as to send the user's input in response to the displayed request.

10. The mobile communication terminal according to claim 9, wherein the controller transmits a short-range communication connection strength to the vehicle at the request of the vehicle.

11. The mobile communication terminal according to claim 9, further comprising a global positioning system (GPS) receiver configured to receive GPS signals, wherein, upon request of the vehicle, the controller transmits GPS position information determined on the basis of the GPS signal, to the vehicle.

12. A method for setting up multi-remote control in a vehicle, the method comprising:
when the vehicle is booted, requesting and receiving a short-range communication connection strength of a plurality of mobile communication terminals located in the vehicle, each of the plurality of the mobile communication terminals including a remote control function for remotely controlling at least one of a plurality of functions of the vehicle;
identifying a mobile communication terminal located in a front seat and a mobile communication terminal located in a rear seat based on the short-range communication connection strength of each of the plurality of mobile communication terminals;
setting at least one first function of the vehicle controlled by the mobile communication terminal located in the front seat;
setting at least one second function of the vehicle, different from the at least one first function, controlled by the mobile communication terminal located in the rear seat; and
displaying, by a display, remote control function setting information of the at least one first function controlled by the mobile communication terminal located in the front seat and the at least one second function controlled by the mobile communication terminal located in the rear seat.

13. The method according to claim 12, further comprising:
when whether the mobile communication terminal is located in the front seat or the rear seat is not determined based on the short-range communication connection strength, requesting and receiving Global Positioning System (GPS) position information of the plurality of mobile communication terminals; and
identifying the mobile communication terminal located in the front seat and the mobile communication terminal located in the rear seat based on the GPS position information and a traveling direction of the vehicle.

14. The method according to claim 13, further comprising, when whether the mobile communication terminal is located in the front seat or the rear seat is not determined based on the short-range communication connection strength or the GPS position information,
transmitting a request for selection of the remote control function to the plurality of mobile communication terminals,
setting each remote control function received from the plurality of mobile communication terminals as the remote control function for each mobile communication terminal, and
displaying, by the display, the remote control function set for each of the plurality of mobile communication terminals in a pop-up type.

15. The method according to claim 12 further comprising:
when a door open signal is generated,
requesting and receiving a short-range communication connection strength to and from the plurality of mobile communication terminals; and
identifying the mobile communication terminal located in the front seat and the mobile communication terminal located in the rear seat based on the short-range communication connection strength.

16. The method according to claim 12, further comprising:
transmitting the corresponding remote control function setting completion information to each of the plurality of mobile communication terminals.

17. The method according to claim 12, wherein the short-range communication connection strength is a Bluetooth communication connection strength.

18. The method according to claim 12, wherein the at least one first function includes a hands free calling function, and the at least one second function includes at least one function performed by at least one device provided in the vehicle.

* * * * *